(12) United States Patent
Snyder et al.

(10) Patent No.: US 8,069,648 B2
(45) Date of Patent: Dec. 6, 2011

(54) IMPINGEMENT COOLING FOR TURBOFAN EXHAUST ASSEMBLY

(75) Inventors: Timothy S. Snyder, Glastonbury, CT (US); Francisco J. Cunha, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 824 days.

(21) Appl. No.: 12/167,780

(22) Filed: Jul. 3, 2008

(65) Prior Publication Data

US 2010/0000197 A1    Jan. 7, 2010

(51) Int. Cl.
*F02K 1/38* (2006.01)
*F02K 1/46* (2006.01)

(52) U.S. Cl. ............ 60/262; 60/766; 60/226.1; 60/761

(58) Field of Classification Search ............... 60/226.1, 60/262, 766, 762, 754, 806, 39.5; 239/127.1, 239/127.3; 415/116, 144
See application file for complete search history.

(56) References Cited

U.S. PATENT DOCUMENTS

| | | | |
|---|---|---|---|
| 2,974,486 A * | 3/1961 | Edwards ............ | 60/762 |
| 4,478,551 A | 10/1984 | Honeycutt, Jr. et al. | |
| 4,573,865 A * | 3/1986 | Hsia et al. ............ | 415/115 |
| 4,643,356 A | 2/1987 | Holler et al. | |
| 4,747,543 A * | 5/1988 | Madden ............ | 239/127.3 |
| 4,833,881 A * | 5/1989 | Vdoviak et al. ............ | 60/762 |
| 4,979,872 A | 12/1990 | Myers et al. | |
| 5,056,307 A | 10/1991 | Liang | |
| 5,209,059 A | 5/1993 | Ward | |
| 5,335,490 A | 8/1994 | Johnson et al. | |
| 5,528,904 A * | 6/1996 | Jones et al. ............ | 60/753 |
| 5,560,198 A | 10/1996 | Brewer et al. | |
| 5,577,381 A | 11/1996 | Eigenbrode et al. | |
| 5,720,434 A | 2/1998 | Vdoviak et al. | |
| 5,775,589 A | 7/1998 | Vdoviak et al. | |
| 5,778,658 A * | 7/1998 | Lamando et al. ............ | 60/204 |
| 5,782,294 A | 7/1998 | Froemming et al. | |
| 6,351,941 B1 | 3/2002 | Vossman et al. | |
| 6,779,336 B2 | 8/2004 | Allore et al. | |
| 6,966,189 B2 | 11/2005 | Lapergue et al. | |
| 7,270,175 B2 * | 9/2007 | Mayer et al. ............ | 165/47 |
| 7,337,875 B2 | 3/2008 | Proscia et al. | |
| 7,464,554 B2 * | 12/2008 | Cheung et al. ............ | 60/754 |
| 7,549,290 B2 * | 6/2009 | Holt et al. ............ | 60/725 |
| 7,798,765 B2 * | 9/2010 | Snyder et al. ............ | 415/1 |
| 7,900,459 B2 * | 3/2011 | Farah ............ | 60/770 |
| 2010/0122537 A1 * | 5/2010 | Yankowich et al. ............ | 60/754 |

FOREIGN PATENT DOCUMENTS

| | | |
|---|---|---|
| EP | 0702141 A2 | 3/1996 |
| EP | 1600608 A2 | 11/2005 |
| EP | 1676993 A2 | 7/2006 |

OTHER PUBLICATIONS

Combined Search and Examination Report of Foreign Counterpart Application No. GB0908102.7.

* cited by examiner

*Primary Examiner* — William H Rodriguez
(74) *Attorney, Agent, or Firm* — Kinney & Lange, P.A.

(57) ABSTRACT

A cooling system for a turbine exhaust assembly comprises an annular case, a flowpath ring and a splash plate. The flowpath ring is coaxially disposed within the annular case. The splash plate extends axially between the annular case and the flowpath ring. A plurality of cooling fluid apertures is formed in the annular case, in order to provide cooling fluid flow onto the splash plate. A plurality of impingement holes is formed in the splash plate, in order to provide impingement flow onto the flowpath ring.

22 Claims, 3 Drawing Sheets

IMPINGEMENT COOLING FOR TURBOFAN EXHAUST ASSEMBLY

STATEMENT OF GOVERNMENT INTEREST

This invention was made with U.S. Government support under Contract No. N00019-02-C-3003, awarded by U.S. Navy. The U.S. Government may have certain rights in the invention.

BACKGROUND OF THE INVENTION

This invention relates generally to gas turbine engines, and specifically to cooling techniques for a turbine exhaust assembly. In particular, the invention concerns impingement cooling of a low-bypass turbofan exhaust case (TEC) assembly, with applications in military aviation and high-performance aircraft.

Standard gas turbine engines are built around a power core comprising compressor, combustor and turbine sections, which are arranged in flow series with an upstream inlet and a downstream exhaust nozzle. The compressor compresses air from the inlet. The compressed air is used an oxidant in the combustor, and, in some applications, for accessory pneumatic functions and environmental control. Fuel is injected into the combustor, where it combines with the compressed air and ignites to produce hot combustion gases. The hot combustion gases drive the engine by expansion in the turbine section, and are exhausted to the nozzle through a turbine exhaust case (TEC) assembly.

The turbine section drives the compressor via a rotating shaft, or, in most larger-scale applications, via a number of coaxially nested shafts and independently rotating turbine/compressor assemblies or spools. Each spool, in turn, employs a number of stages, in which rotating blades coupled to the shaft are alternated with stationary vanes coupled to a shroud or other fixed component of the engine housing.

Energy that is not used to drive the compressor and accessory functions is available for extraction and use. In ground-based applications, energy is typically delivered in the form of rotational motion, which is used to drive an electrical generator or other mechanical load coupled to the shaft. In aviation applications, the gas turbine engine also provides reactive thrust.

The relative contributions of rotation and thrust depend upon engine design. In turbojet engines, for example, which are an older design, essentially all the net thrust is generated in the exhaust. In modern turbofan engines, on the other hand, the shaft is used to drive a ducted propeller or forward fan, which generates additional thrust by forcing air through a bypass flow duct surrounding the engine core.

Turbofan engines include low-bypass turbofans, in which the bypass flow is relatively small with respect to the core flow, and high-bypass turbofans, in which the bypass flow is greater. High-bypass turbofans tend to be quieter, cooler and more energy efficient, particularly in subsonic flight applications for commercial and other general-purpose aircraft. Low-bypass turbofans can be somewhat louder and less fuel efficient, but provide greater specific thrust. For these and other reasons, low-bypass turbofans are generally utilized in military jet fighters and other high-performance supersonic aircraft.

In supersonic applications, the turbofan engine is typically provided with an afterburner. Afterburning systems provide thrust augmentation by injecting additional fuel into an augmentor assembly, downstream of the TEC, where it mixes with the core flow and ignites to increase the thrust. Afterburning substantially enhances engine performance, but is also associated with additional costs in efficiency, noise output and thermal signature.

The main design goals for aviation-based gas turbine engines are performance, efficiency, reliability and service life. Performance and efficiency both favor higher combustion temperatures, which increase the engine's specific thrust and overall thermodynamic efficiency. Unfortunately, higher combustion temperatures also result in increased thermal and mechanical loads, particularly for engine components along the hot gas flowpath, downstream of the combustor. This can affect service life and reliability, and increase operational costs associated with maintenance and part replacement.

In high-performance (low-bypass) turbofans, gas path temperatures are often a factor at the TEC assembly, where hot combustion gases flow from turbine section (upstream of the TEC) toward the afterburner/augmentor (downstream of the TEC). The issue can be problematic proximate the forward outer diameter ring (FODR), on the upstream end of the TEC assembly. In this region, operational conditions can sometimes establish a negative pressure differential between the FODR plenum, which surrounds the FODR, and the exhaust gas flow, inside the FODR.

Negative FODR plenum overpressure allows hot gas inflow, impairing cooling efficiency. The result is decreased service life and increased risk of mechanical failure. There is thus a need for improved TEC assembly cooling techniques that provide increased service life and reliability without sacrificing performance and efficiency.

BRIEF SUMMARY OF THE INVENTION

This disclosure concerns an impingement cooling system for a turbofan exhaust case (TEC) assembly, adaptable to low-bypass turbofan engines for supersonic aircraft. The system comprises an annular case, a flowpath ring for turbine exhaust and a splash plate.

The flowpath ring is coaxially oriented within the annular case. The splash plate extends axially between the annular case and the flowpath ring. Cooling fluid apertures in the annular case provide cooling flow onto the splash plate, and impingement holes in the splash plate provide impingement flow onto the flowpath ring. The system provides positive overpressure along the axial extent of the flowpath ring, preventing hot gas inflow.

DETAILED DESCRIPTION

Figure 1:
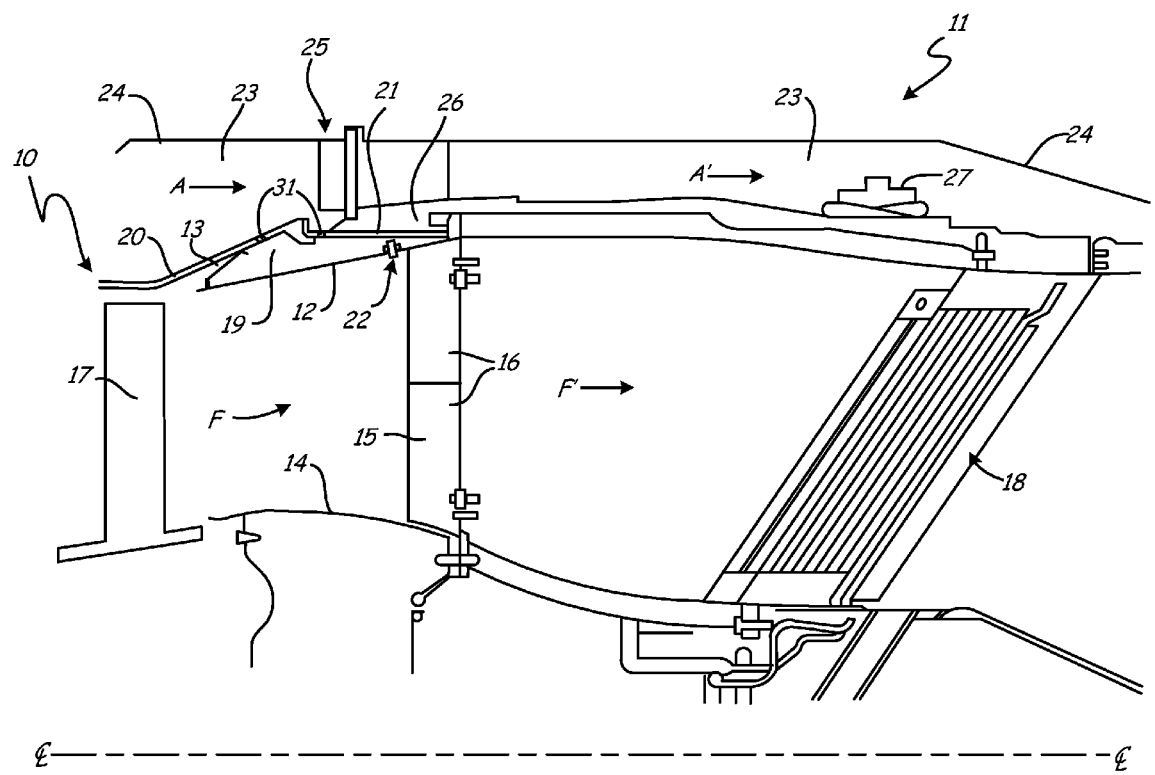
FIG. 1 is a cross-sectional schematic of a turbine exhaust case (TEC) assembly, located in an aft portion of a turbofan engine.

FIG. 1 is a cross-sectional schematic of turbine/turbofan exhaust case (TEC) assembly 10, located in an aft portion of turbofan engine 11. TEC assembly 10 and turbofan 11 form generally annular or cylindrical bodies about axial centerline $C_L$, with FIG. 1 showing the top cross section only. The illustrated region of turbofan 11 is aft (downstream) of the compressor and combustor sections (not shown in FIG. 1), and forward (upstream) of the exhaust nozzle (also not shown).

TEC (turbine exhaust case) assembly 10 comprises forward outer diameter ring (FODR) 12, finger seal 13, forward inner diameter ring (FIDR) 14 and TEC leading edge piece 15. TEC leading edge piece 15 comprises a combination of strut or support rod components to space FODR 12 from FIDR 14, which are contained within fairing assembly 16. In some embodiments, TEC assembly 10 also includes one or more elements of the low-pressure turbine (LPT) section, such as final LPT stator (vane) stage 17.

FODR 12, finger seal 13, FIDR 14, TEC leading edge piece 15 and the other components of TEC assembly 10 are typically manufactured from durable heat-resistant materials such as high-temperature metal alloys or superalloys. This protects the components from extreme operational conditions due to the flow of high-temperature exhaust (hot combustion gases), downstream of the combustor and turbine sections. In some embodiments, one or more of these components is provided with a thermal or protective coating, such as a ceramic thermal barrier coating (TBC), an aluminide coating, a metal oxide coating, a metal alloy coating, a superalloy coating, or a combination thereof.

TEC assembly 10 forms a generally annular flowpath or flow region for core working fluid (exhaust gas) flow between LPT stage 17 and afterburner assembly (augmentor) 18. FODR 12 forms an outer flow ring around the annular exhaust flowpath, and FIDR 14 forms an inner flow ring inside the annular exhaust gas flowpath. Thus FODR 12 defines a radially outer boundary for the combustion gas flow, and FIDR 14 defines a radially inner boundary for the combustion gas flow.

Forward outer diameter ring plenum (FODR plenum) 19 forms a generally annular cavity, coaxially oriented about the hot exhaust gas flowpath inside FODR 12, and within the relatively cool bypass flowpath in bypass duct 23, described below. More specifically, FODR plenum 19 comprises a plenum section with a radially inner margin (or boundary) defined at least in part by FODR 12, along the hot exhaust gas flowpath, and a radially outer margin (or boundary) defined at least in part by LPT case 20 or inner case 21, or both, along the cool bypass flowpath.

LPT case (or turbine case) 20 is coaxially disposed about the turbine section of turbofan 11, which extends upstream of TEC assembly 10. Inner case (or exhaust case) 21 extends downstream of LPT case 20, and is coaxially disposed about TEC assembly 10.

Finger seal 13 forms a pressure and fluid flow seal between FODR 12 and LPT case 20 at the forward (upstream) end of FODR plenum 19, and FODR 12 forms a pressure and fluid flow seal with inner case 21 at the aft end of FODR plenum 19. This defines the axial extent of FODR plenum 19, from the forward end of FODR 12 proximate finger seal 13, to the aft end of FODR 12 downstream of probe assembly 22.

Hot exhaust gases flow downstream through turbine exhaust case 10 from final turbine stage(s) 17 toward augmentor 18. The core exhaust gas flowpath comprises a region of divergent and radial/axial flow F, in the forward or upstream section of TEC assembly 10, and a region of substantially axial flow F', in the aft or downstream section of TEC 10.

Probe assembly 22 extends from FODR plenum 19 through FODR 12, into the core exhaust gas flowpath between FODR 12 and FIDR 14. Probe assembly 22 is used to measure hot gas path fluid parameters, as described in more detail with respect to FIG. 2.

Bypass flow duct 23 forms an annular channel for bypass flow around the engine core. In the region of TEC assembly 10, the inner margin of bypass flow duct 23 is defined or formed along LPT case 20 and inner case 21, and coincides with the radially outer margin of FODR plenum 19. The outer margin of bypass duct 23 is defined along outer engine casing (or fan cowling) 24. Bypass duct 23 also extends downstream of TEC assembly 10, past blocker door 25 toward afterburner/augmentor assembly 18.

Cooling fluid plenum 26 is formed about the aft end of TEC assembly 10, between inner case 21 and bypass flow duct 23. In some embodiments, cooling fluid plenum 26 extends downstream of TEC assembly 10 toward augmentor 18. In these embodiments, cooling fluid plenum 26 typically extends to modulated exhaust cooling (MEC) module 27, which provides flow during afterburning operation of augmentor 18.

Blockers 25 are typically formed as vanes or fixed blades with an airfoil cross section. Each blocker (or blocker door) 25 comprises forward (upstream) blocker section 28, aft (downstream) blocker section 29 and blocker seal 30. Blocker seal 30 is typically formed as a finger seal or similar structure that forms a pressure and flow seal between blocker door 25 and a radially inner boundary or margin of bypass duct 23, such as inner case 21.

A number of blockers 25 are circumferentially arranged about bypass duct 23. Each blocker 25 extends from the radially inner boundary of bypass flow duct 23 to a radially outer boundary or margin of bypass flow duct 23, such as engine casing 24. Forward blocker section (or blocker door) 28 with blocker seal 30 is configured to "swing" or move in a circumferential sense with respect to aft blocker section 29, reducing the flow space between adjacent blockers 25.

Blockers 25 form a modulating exhaust cooling device configured for variable closure and commensurate bypass flow reduction. In particular, blockers 25 function as a variable area device that regulates the relative pressure differential between upstream bypass flow A and downstream bypass flow A'.

When forward blocker section 28 is aligned with aft blocker section 29, blockers 25 are substantially axially oriented and the bypass flow area is relatively large. In this configuration, bypass flow is increased and the relative pressure differential between upstream bypass flow A and downstream bypass flow A' is decreased. When forward section 28 swings or rotates with respect to downstream blocker section 29, such that the two sections of blocker 25 are out of alignment, the flow area is reduced and the pressure differential is increased.

Hot gas flow through TEC assembly 10 creates a need for active cooling, particularly in the region proximate FODR 12 and the other upstream components of TEC assembly 10. To provide efficient cooling and prevent inflow in this region, a positive overpressure is desired between FODR plenum 21 and the hot flowpath. In particular, it is desired that the cooling fluid pressure exceeds the combustion gas pressure along the complete axial extent of FODR plenum 19 and FODR 12.

Achieving this positive overpressure is complicated by the fact that the hot gas flowpath along FODR 12 tends to exhibit increased pressure in the downstream (aft) direction. In particular, the radial flow component of incoming flow F is reduced by TEC assembly 10, such that outgoing flow F' is straightened and becomes more axial. As the flow straightens it also diverges and slows, as compared between the forward and aft ends of FODR 12, FIDR 14 and FODR plenum 19.

Flow straightening has a number of benefits, including reduced turbulence, improved engine and augmentor efficiency, and lower radar and infrared (thermal) profile. Unfortunately, flow straightening is also associated with an increase in the hot gas path pressure along the TEC assembly, due to Bernoulli's principle and other effects such as flow stagnation, recirculation and turbulence. In previous engine designs, this resulted in a region of negative overpressure along at least at the aft end of the FODR plenum, particularly during power lift testing, STOVL (short takeoff or vertical landing) and other high-pressure, high-temperature core flow conditions.

To address this situation, FODR plenum 19 is provided with direct-flow or "main jet" cooling fluid apertures 31. Main jet apertures 31 provide direct cooling flow into FODR plenum 19, utilizing high-pressure flow A from the upstream region of bypass duct 23. In particular, main jet apertures 31 are located forward of blocker door 25, where upstream flow A exhibits a relatively higher pressure than downstream flow A', aft of blocker door 25.

This distinguishes from designs that utilize lower-pressure cooling fluid sources such as plenum 26, a bleed air system or lower-pressure bypass flow A', in the downstream region of bypass duct 23. These indirect sources provide lower-pressure cooling fluid to FODR plenum 19 than direct-flow apertures 31, because they require longer, more convoluted and circuitous flow paths, or are otherwise subject to increased blockages, obstructions, constrictions, friction and associated loss mechanisms. Indirect sources such as plenum 26 can also problematic when in flow communication with additional downstream loads, such as MEC module 23 or a TEC OD (outside diameter) feed system.

Main jet apertures 31, in contrast, provide sufficient direct cooling fluid flow to generate a positive overpressure along the full axial extent of FODR plenum 19. Adjustable blocker doors 25, moreover, located downstream of main jet apertures 31, allow the positive overpressure to be maintained over a wide range of turbofan operating conditions. This positive overpressure enhances TEC assembly cooling, but also implicates a number technical design challenges, as described below.

Figure 2:
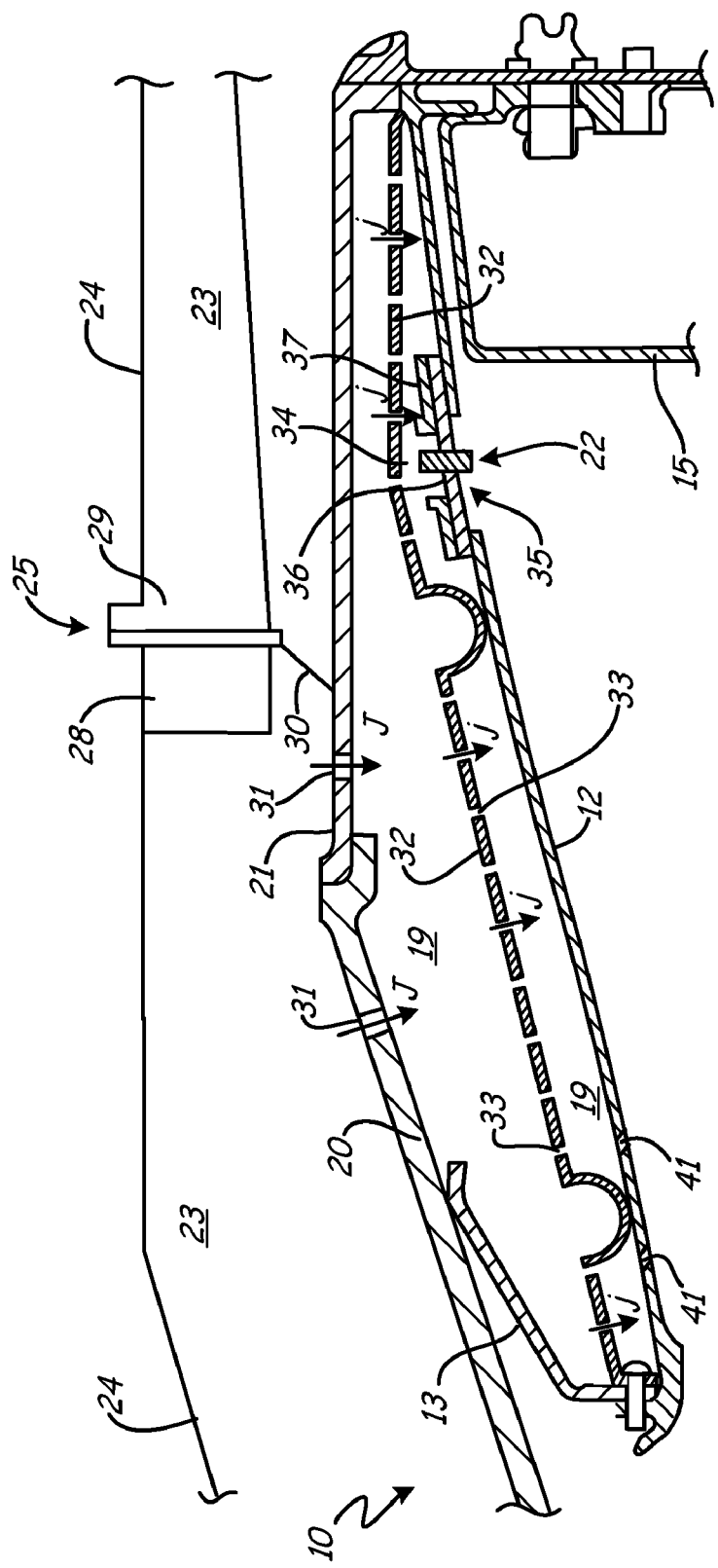
FIG. 2 is an expanded cross-sectional schematic of the TEC assembly in FIG. 1, showing high-pressure cooling fluid supply apertures, a splash plate and impingement holes.

FIG. 2 is a cross-sectional schematic of TEC assembly 10, showing high-pressure cooling fluid (main jet) apertures 31 and splash plate 32 with impingement holes 33. TEC assembly 10 comprises FODR 12, finger seal 13 and TEC leading edge piece 15, as described with respect to FIG. 1, above. Apertures 31 feed high-pressure cooling fluid from bypass duct 23 to FODR plenum 19, and splash plate/baffle 32 provides impingement cooling of FODR 12 via impingement holes 33.

As shown in FIG. 2, TEC assembly 10 is configured for use in a low-bypass, high-performance afterburning turbofan. In other embodiments, the particular details of TEC assembly 10 vary, particularly the size and configuration of FODR plenum 19 and its related engine components, including FODR 12, finger seal 13, TEC leading edge piece 15, LPT case 20, inner case 21, probe assembly 22, splash plate 32, and FIDR 14 (which is shown in FIG. 1).

Direct-flow, high-pressure cooling fluid apertures 31 are formed as holes, slots or other openings in one or both of LPT case 20 and inner case 21. Typically, apertures 31 are formed by mechanical drilling, electron beam drilling, laser drilling, laser percussion drilling, electron discharge machining, or another drilling or machining technique. Alternatively, apertures 31 are formed by any combination of drilling, machining, stamping, casting and molding, and analogous techniques.

In some embodiments, apertures 31 are formed only in LPT case 20. In these embodiments, apertures 31 are sometimes formed as a single row of at least ten (10) holes, with a total area of at least two and one half square inches (2.5 in², or about 1,600 mm²). In one such embodiment, apertures 31 comprise approximately eighteen (18) holes, with a diameter of about one half inch (0.50", or about 12.7 mm) each, and a total area of about three and a half square inches (3.5 in², or about 2,300 mm²).

In other embodiments, apertures 31 are formed only in inner case 21. In these embodiments, apertures 31 are sometimes formed in a single row of at least one hundred (100) holes, with a total area of at least two and one half square inches (2.5 in², or about 1,600 mm²). In one such embodiment, apertures 31 comprise approximately one hundred eighty-three (183) holes, with a diameter of about five thirty-seconds of an inch (5/32", or about 4.0 mm) each, and a total area of about three and a half square inches (3.5 in², or about 2,300 mm²).

In additional embodiments, apertures 31 vary in number and area, and are formed into different numbers of rows in one or both of LPT case 20 and inner case 21. In embodiments with multiple rows of apertures 31, the rows are either axially aligned or are staggered (or "clocked"), such that individual apertures 31 are rotated about axial centerline $C_L$ with respect to one another. Alternatively, apertures 31 are arranged into other geometric patterns, or are randomly or arbitrarily distributed along LPT case 20 and inner case 21.

Like the other components of TEC assembly 10, splash plate (or impingement baffle) 32 is manufactured from durable heat-resistant materials such as metal alloys and superalloys, and is sometimes provided with one or more protective coatings. Impingement holes 33 are formed in impingement baffle 32 via a combination of drilling, machining, stamping, molding and related processes, as described above with respect to main jet cooling fluid apertures 31. Baffle 32 is spaced from FODR 12 via a number of dimples or protrusions formed onto baffle 32, or via similar spacing means.

FODR plenum 19 extends between a radially inner boundary along FODR 12 (that is, along the hot exhaust gas flowpath between FODR 12 and FIDR 14), and a radially outer boundary along LPT case 20 and inner case 21 (along the cool bypass flowpath inside bypass duct 23). Impingement baffle 32 extends coaxially within FODR plenum 19, from a forward end located proximate finger seal 13 to an aft end located downstream of probe assembly 22. Typically, baffle 32 is mechanically attached at the forward and aft ends using bolts, screws, welds or other means of mechanical attachment, depending upon the particular configuration of FODR plenum 19 and TEC assembly 10.

Probe assembly 22 comprises probe 34, extending through probe opening 35, and a probe boss with various components such as sliding seal or ring seal 36 and seal tab or retention ring 37. The probe boss components form a mechanical attachment and pressure seal between probe 34 and FODR 12. Probe 34 comprises a sensor or probe device such as an exhaust gas temperature (EGT) probe or EGT sensor, a pressure probe or pressure sensor, a velocity probe or velocity sensor, or another sensing device used to measure hot gas path parameters proximate FODR 12.

In typical embodiments, a number of probe assemblies 22 are circumferentially arranged around FODR 12 and FODR plenum 19. In these embodiments, individual probe assemblies 22 provide a range of related sensing and measurement functionalities, depending upon the desired gas path parameter measurements. The particular configuration of probe assemblies 22 also depends upon whether TEC assembly 10 is undergoing testing or is installed on an aircraft for flight operation.

High-pressure (direct-flow) apertures 31 supply cooling fluid to FODR plenum 19 from upstream bypass flow A in bypass duct 23, via one or both of LPT case 20 and inner case 21. Apertures 31 provide FODR plenum 19 with a positive overpressure, as compared to the hot gas path (core flow) inside TEC assembly 10. That is, the cooling fluid pressure inside FODR plenum 19 is greater than the hot combustion gas pressure, all along the core flowpath between FODR 12 and FIDR 14. In particular, the positive overpressure extends along the axial extent of FODR plenum 19, from the upstream (forward) end of FODR plenum 19 to the downstream (aft) end of FODR plenum 19, past probe assembly 22. This prevents inflow through probe opening 35 or probe boss components such as sliding seal/ring seal 36 and seal tab/retention ring 37, or through film cooling holes as described below.

In designs that do not provide a positive overpressure along FODR plenum 19, the plenum is subject to inflow. That is, if the core flow pressure exceeds the cooling fluid pressure inside FODR plenum 19, hot combustion gases can intrude via probe assembly 22, film cooling holes or other entry points. Hot gas inflow impairs cooling efficiency, resulting in temperature gradients, differential expansion and deformation. These effects, in turn, generate additional inflow and cooling losses. Inflow can also impair gas path parameter measurements at probe assembly 22, reducing the ability to precisely and efficiently control engine operations.

In contrast to previous designs, direct flow apertures 31 maintain a positive overpressure in FODR plenum 19 in order to prevent inflow even under extreme operating conditions such as power-lift and STOVL operations. This increases cooling efficiency along the full extent of FODR 12, which in turn decreases the effects of differential expansion and deformation, reduces wear and tear, and extends service life. In some embodiments, improved cooling also extends the safe operating range of TEC assembly 10, thus improving engine performance.

FIG. 2 also illustrates the structure of splash plate (impingement baffle) 32, which provides impingement cooling along FODR 12. In particular, cooling fluid from direct-flow apertures 31 is supplied at relatively high pressure, such that main jets J typically flow from bypass duct 23 to FODR plenum 19 under sonic conditions (that is, with a Mach number of approximately one).

In designs without splash plate 32, main jets J would impinge directly upon FODR 12, producing a highly variable heat transfer coefficient that is relatively high along the main jet line, but attenuates rapidly away from the point of main jet impact. This would subject FODR 12 to substantial temperature gradients and thermal stresses, reducing average service life and increasing the risk of infant mortality (that is, the risk of separation or other thermal or mechanical failure, before reaching service life expectancy).

As shown in FIG. 2, however, main (sonic) jets J impinge on baffle 32, rather than FODR 12. Because baffle 32 is located within FODR plenum 19, and not exposed to hot combustion gas flow, baffle 32 is not subject to the same effects that occur when main jets J impact directly on FODR 12. Baffle 32 converts main jets J into a number of smaller and more uniformly distributed impingement jets j, which are directed through impingement holes 33 to provide more uniform impingement flow onto FODR 12 and other components of TEC assembly 20, such as probe assembly 22.

Splash plate/baffle 32 and impingement holes 33 substantially improve cooling efficiency and uniformity along TEC assembly 10, reducing thermal stresses and differential expansion and improving conductive heat transfer. This in turn reduces mechanical wear and tear and mechanical stress, increasing service life and reducing the probability of infant mortality. These effects are not limited, moreover, to the particular components directly subject to impingement jets j. Because improved cooling reduces thermal gradients and mechanical stress, it also benefits engine components that are thermally or mechanically coupled to FODR 12, including finger seal 13, TEC leading edge piece 15, FIDR 14, LPT case 20 and inner case 21.

As shown in FIG. 2, TEC assembly 10 contrasts with designs that supply FODR plenum 19 via relatively low-pressure cooling fluid plenum 26, and with designs that do not provide impingement cooling. TEC assembly 10 further contrasts with designs that utilize a higher-pressure cooling fluid supply, but do not utilize a splash plate or impingement baffle to more uniformly distribute impingement flow onto FODR 12, or which utilize cooling sleeve assemblies or similar structures to direct main cooling fluid jets away from FODR 12, in order to avoid the large thermal gradients associated with direct-jet impingement cooling.

In this respect, the baffled configuration of FODR plenum 19 provides not only improved impingement cooling but also allows simpler formation of direct-feed (high-pressure) cooling fluid apertures 31. In particular, main jet apertures 31 are configurable as simple holes that do not require cooling sleeves. This lowers costs, simplifies engine design, and reduces the number of potential failure points. Impingement jets j also provide more effective cooling than bulk swirl flow, reducing or obviating the need for tangentially angled holes, angled cooling sleeve assemblies, and other swirl-inducing components.

Positive overpressure within FODR plenum 19 provides greater flexibility in the positioning of film cooling holes 41. In designs without positive overpressure along the complete axial extent of FODR plenum 19, film cooling holes 41 are restricted, for example, to the forward end of FODR 12, as shown in FIG. 2, in order to avoid inflow. Once a positive overpressure is established all along FODR plenum 19, film cooling holes 41 are locatable anywhere along FODR 12, including downstream regions, without experiencing inflow.

Figure 3:
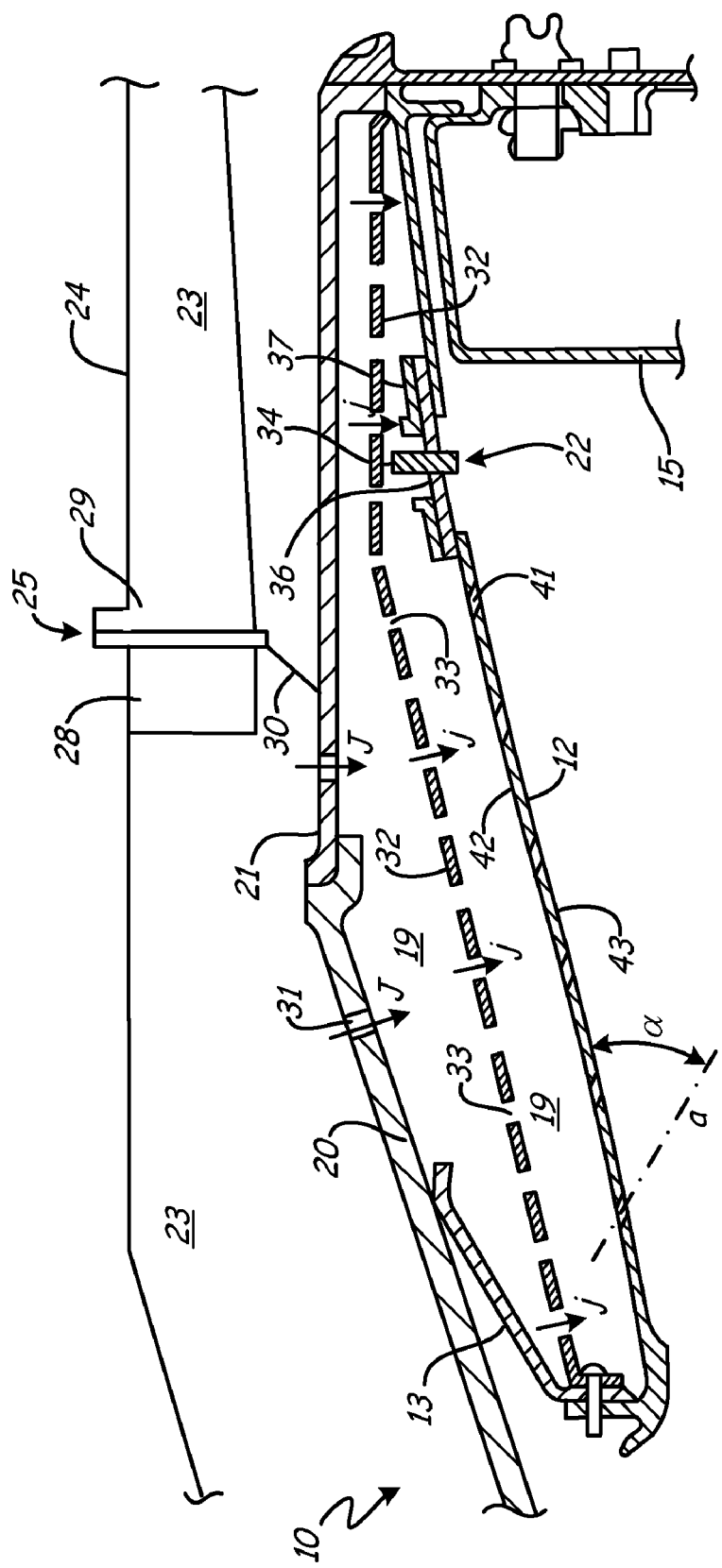
FIG. 3 is an additional cross-sectional schematic of the TEC assembly in FIG. 2, showing film cooling openings.

FIG. 3 is an additional cross-sectional schematic of TEC assembly 10, showing film cooling openings 41 extending along the axial extent of FODR 12. Film cooling holes 41 are formed as apertures, holes, slots or other openings in FODR 12, in order to transmit cooling fluid from radially outer (cold) side 42 of FODR 12 to radially inner (hot) side 43, which is exposed to hot exhaust gas flow.

Film cooling holes 41 are formed into FODR 12 by mechanical drilling, electron beam drilling, laser drilling, laser percussion drilling, electron discharge machining, or another drilling or machining technique, as described above. Holes 41 are typically formed in a number of annular rows, in which individual holes are either axially aligned or staggered (clocked), or exhibit a random or arbitrary distribution, as described above for impingement holes 33, and as determined in order to address the particular cooling requirements of FODR 12 and other specific components of TEC assembly 10.

Baffle 12 converts main jets J into impingement jets j, as described above. In the particular embodiment of FIG. 3, the spacing and size of impingement holes 33 each vary along the axial extent of baffle 12 and FODR plenum 19. FIG. 3 further illustrates an embodiment in which baffle 12 is spaced from FODR 12 at the forward and aft ends, rather than by distributing dimples, protrusions or other spacing means along the axial extent of baffle 12, as shown in FIG. 2.

Fluid flow through openings 41 generates a post-impingement cooling film along hot side 43 of FODR 12, reducing heat transfer from the combustion gas to TEC assembly 10. The cooling film also increases heat transfer by carrying heat from hot side 43 of FODR 12 into the core (hot exhaust gas) flow, where it passes downstream.

Post-impingement film cooling openings 41 are formed at angle α with respect to FODR 12, where angle α is measured from the surface to axis α of each opening 41; that is, from the surface toward the perpendicular. A ninety-degree hole angle (α=90°), for example, corresponds to a film cooling hole that is perpendicular to the surface, while a smaller hole angle (α≦90°) lies more along the surface.

In some embodiments, angle α is approximately twenty degrees (α≈20°), or between about fifteen degrees and about thirty degrees (15°≦α≦30°). In other embodiments, angle α between about ten degrees and about forty-five degrees (10°≦α≦45°). In addition, depending upon the fabrication process of film cooling holes 41, angle α can either be measured from hot side (hot surface) 43, as shown in FIG. 3, or from cold side (cold surface) 42.

Typically, axis a of film cooling openings 41 is coplanar with axial centerline $C_L$, such that angle α is a downstream angle (or "streamline" angle), designed to encourage attached flow in a downstream axial direction along hot side 43 of FODR 12. In some embodiments, film cooling openings 41 also have a circumferential component, as measured tangentially along hot surface 43 (or cold surface 43), and perpendicularly to central axis $C_L$. In these embodiments, the circumferential angle typically varies between ten and forty-five degrees (10-45°), in order to encourage tangential film flow along hot side (hot surface) 43 of FODR 12.

In previous designs, film cooling holes were limited to the forward end of FODR 12, as shown in FIG. 2, because the cooling fluid did not have a positive overpressure all along FODR plenum 19. This was particularly problematic at the aft end of FODR 12, where the hot gas path pressure increases due to expansion, stagnation and recirculation, leading to inflow as described above. Where inflow occurs, film cooling is essentially impossible, or at least substantially degraded in both efficacy and efficiency, because the holes must be located upstream of the desired cooling location.

With direct-flow (high-pressure) cooling fluid apertures 31, FODR plenum 19 maintains a positive cooling fluid overpressure all along the axial extent of FODR 12. This prevents inflow and allows film cooling holes 41 to be located along the complete axial extent of FODR 12, including aft regions downstream of probe assembly 22. This allows film cooling holes 41 to be located and sized on the basis of cooling needs, rather than being limited by the core gas path pressure.

The result is greater cooling efficacy and efficiency. Efficacy improves because film cooling holes 41 are located where most needed, including aft (downstream) locations along FODR 12, and are not restricted to forward (upstream) locations. Efficiency also improves, because less cooling fluid is required when film cooling holes 41 are located where cooling is required, rather than being placed upstream (forward) due to pressure considerations.

Positive plenum overpressure also allows cooling holes 41 to be more uniformly distributed along the entire axial extent of FODR 12, decreasing temperature gradients and thermal stress, and reducing differential expansion and mechanical stress. This also has beneficial effects both for FODR 12 and the other components of TEC assembly 10 that are thermally or mechanically coupled to FODR 12, as described above for impingement baffle 32 and impingement holes 33.

The present invention has been described with reference to preferred embodiments. The terminology used is for the purposes of description, not limitation, and workers skilled in the art will recognize that changes may be made in form and detail without departing from the spirit and scope of the invention.

The invention claimed is:

1. A system comprising:
   a bypass duct having an inner margin and an outer margin;
   an annular turbine case formed at the inner margin of the bypass duct;
   a flowpath ring for turbine exhaust, coaxially disposed within the annular turbine case;
   a splash plate extending axially between the annular turbine case and the flowpath ring;
   a plurality of cooling fluid apertures in the annular turbine case, for providing cooling fluid flow from the bypass duct onto the splash plate; and
   a plurality of impingement holes in the splash plate, for providing impingement flow onto the flowpath ring; and
   a blocker door positioned in the bypass duct in a downstream direction from the plurality of cooling fluid apertures, for increasing a relative pressure of the cooling fluid flow from the bypass duct onto the splash plate.

2. The system of claim 1, wherein the cooling fluid flow is substantially sonic through the plurality of cooling fluid apertures, with a Mach number of approximately one.

3. The system of claim 1, wherein the blocker door is positioned to reduce a flow area of the bypass duct such that the relative pressure of the cooling fluid flow is increased to provide a positive overpressure along a full axial extent of the flowpath ring.

4. The system of claim 3, further comprising a plurality of film cooling openings formed in the flowpath ring to provide film cooling flow from a radially outer surface of the flowpath ring to a radially inner surface of the flowpath ring.

5. The system of claim 4, wherein the film cooling openings extend to an axially aft portion of the flowpath ring.

6. The system of claim 4, wherein the film cooling openings extend substantially along the full axial extent of the flowpath ring.

7. The system of claim 1, wherein the annular turbine case comprises an inner turbine exhaust case.

8. The system of claim 7, wherein the plurality of cooling fluid apertures comprises a row of at least ten apertures in the inner turbine exhaust case, the apertures having a total area of at least two and one half square inches (at least 1,600 square millimeters).

9. The system of claim 1, wherein the annular turbine case comprises an outer low-pressure turbine case.

10. The system of claim 9, wherein the plurality of cooling fluid apertures comprises a row of at least one hundred apertures in the outer low-pressure turbine case, the apertures having a total area of at least two and one half square inches (at least 1,600 square millimeters).

11. A system comprising:
    a bypass flowpath;
    a turbine exhaust flowpath;
    a plenum section defined between a radially outer boundary along the bypass flowpath and a radially inner boundary along the turbine exhaust flowpath;
    a baffle extending from a forward location in the plenum to an aft location in the plenum, between the radially outer boundary and the radially inner boundary;
    a plurality of cooling fluid apertures formed in the radially outer boundary along the bypass flowpath;
    a plurality of impingement holes formed in the baffle, wherein the cooling fluid apertures provide cooling fluid flow from the bypass flowpath into the plenum section with positive overpressure along a full axial extent of the plenum to prevent inflow from the turbine exhaust; and a plurality of blocker doors circumferentially arranged about the bypass flowpath in a downstream direction from the plurality of cooling fluid apertures for increasing the overpressure of cooling fluid flow by reducing a flow area of the bypass flowpath.

12. The system of claim 11, further comprising a plurality of film cooling holes formed in the radially inner boundary.

13. The system of claim 12, wherein the plurality of film cooling holes are distributed along an aft section of the radially inner boundary.

14. The system of claim 11, wherein the radially outer boundary comprises a turbine case disposed about a turbine section located in an upstream direction from the turbine exhaust flowpath.

15. The system of claim 14, wherein the plurality of cooling fluid apertures comprises ten or more apertures with a diameter of at least one half inch (at least 12.7 mm).

16. The system of claim 11, wherein the radially outer boundary comprises an exhaust case disposed about the turbine exhaust flowpath.

17. The system of claim 16, wherein the plurality of cooling fluid apertures comprises one hundred or more apertures with a diameter of at least five thirty-seconds of an inch (at least 4.0 mm).

18. An assembly comprising:
an inner turbine exhaust flow ring;
an outer turbine exhaust flow ring coaxially disposed about the inner turbine exhaust flow ring;
an annular plenum section defined about the outer turbine exhaust flow ring;
an annular turbine case defining an outer margin of the annular plenum section;
a plurality of main jet apertures formed in the annular turbine case for directing main jets of cooling fluid from a bypass duct into the plenum section;
a splash plate having a plurality of impingement jet apertures for converting the main jets into impingement jets directed onto the outer turbine exhaust flow ring, wherein the main jets of cooling fluid provide sufficient positive overpressure along a full axial extent of the plenum section to prevent inflow of turbine exhaust; and
a plurality of adjustable blocker doors positioned in the bypass duct in a downstream direction from the main jet apertures, such that the adjustable blocker doors regulate the overpressure provided by the main jets of cooling fluid.

19. The assembly of claim 18, further comprising a plurality of film cooling holes extending to a downstream portion of the outer turbine exhaust flow ring.

20. The assembly of claim 19, wherein the plurality of film cooling holes extending along a full axial extent of the outer turbine exhaust flow ring.

21. The assembly of claim 18, wherein the plurality of main jet apertures direct the main jets of cooling fluid through a turbine exhaust case.

22. The assembly of claim 18, wherein the plurality of main jet apertures direct the main jets of cooling fluid through a turbine case.

* * * * *

UNITED STATES PATENT AND TRADEMARK OFFICE
CERTIFICATE OF CORRECTION

PATENT NO. : 8,069,648 B2  
APPLICATION NO. : 12/167780  
DATED : December 6, 2011  
INVENTOR(S) : Timothy S. Snyder Page 1 of 1

It is certified that error appears in the above-identified patent and that said Letters Patent is hereby corrected as shown below:

Col. 10, Line 16 (line 11 of claim 1)
  Delete "and"

Signed and Sealed this
Twenty-eighth Day of February, 2012

David J. Kappos
*Director of the United States Patent and Trademark Office*